US007104120B2

(12) United States Patent
Gladden

(10) Patent No.: US 7,104,120 B2
(45) Date of Patent: Sep. 12, 2006

(54) METHOD AND SYSTEM OF DETERMINING LIFE OF TURBOCHARGER

(75) Inventor: John R. Gladden, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 33 days.

(21) Appl. No.: 10/791,078

(22) Filed: Mar. 2, 2004

(65) Prior Publication Data

US 2005/0193810 A1    Sep. 8, 2005

(51) Int. Cl.
G01M 15/00 (2006.01)
(52) U.S. Cl. .................................... 73/119 R
(58) Field of Classification Search ........... 73/117–120
See application file for complete search history.

(56) References Cited

U.S. PATENT DOCUMENTS 6,163,254 A * 12/2000 Smith et al. ................. 340/439
6,209,390 B1   4/2001 LaRue et al.
6,401,457 B1 * 6/2002 Wang et al. .................... 60/599
6,785,635 B1   8/2004 von Flotow

* cited by examiner

Primary Examiner—Edward Lefkowitz
Assistant Examiner—Jermaine Jenkins
(74) Attorney, Agent, or Firm—Liell & McNeil

(57) ABSTRACT

In order to accurately determine a life of a turbocharger, the specific use, herein referred to as a "duty cycle" of the turbocharger, should be monitored. However, in order to directly monitor the duty cycle of the turbocharger, there are additional costs of assembly and installation of a turbocharger rotational speed sensor. The present invention determines a life of a turbocharger by indirectly monitoring the duty cycle of the turbocharger through sensors that generally serve a pre-existing purpose within a vehicle or machine. A compressor inlet pressure sensor and compressor outlet pressure sensor are in communication with an electronic control module that includes a life determining algorithm. The life determining algorithm determines the life of the turbocharger based on a relationship between a sensed compressor inlet pressure and a sensed compressor outlet pressure. By monitoring the relationship between the sensed compressor inlet pressure and the sensed compressor outlet temperature, the fatigue and the creep of at least one component of the turbocharger is monitored.

20 Claims, 3 Drawing Sheets

| | $FPR^1_{(10)}$ | $FPR^1_{(9)}$ | $FPR^1_{(8)}$ | $FPR^1_{(7)}$ | $FPR^1_{(6)}$ | $FPR^1_{(5)}$ | $FPR^1_{(4)}$ | $FPR^1_{(3)}$ | $FPR^1_{(2)}$ | $FPR^1_{(1)}$ |
|---|---|---|---|---|---|---|---|---|---|---|
| $FPR^2_{(10)}$ | — | $FS_{tt}$ | $FS_{ss}$ | $FS_{qq}$ | $FS_{nn}$ | $FS_{jj}$ | $FS_{ee}$ | $FS_y$ | $FS_q$ | $FS_i$ |
| $FPR^2_{(9)}$ | — | — | $FS_{rr}$ | $FS_{pp}$ | $FS_{mm}$ | $FS_{ii}$ | $FS_{dd}$ | $FS_x$ | $FS_p$ | $FS_h$ |
| $FPR^2_{(8)}$ | — | — | — | $FS_{oo}$ | $FS_{ll}$ | $FS_{hh}$ | $FS_{cc}$ | $FS_v$ | $FS_o$ | $FS_g$ |
| $FPR^2_{(7)}$ | — | — | — | — | $FS_{kk}$ | $FS_{gg}$ | $FS_{bb}$ | $FS_u$ | $FS_n$ | $FS_f$ |
| $FPR^2_{(6)}$ | — | — | — | — | — | $FS_{ff}$ | $FS_{aa}$ | $FS_t$ | $FS_m$ | $FS_e$ |
| $FPR^2_{(5)}$ | — | — | — | — | — | — | $FS_z$ | $FS_s$ | $FS_l$ | $FS_d$ |
| $FPR^2_{(4)}$ | — | — | — | — | — | — | — | $FS_r$ | $FS_k$ | $FS_c$ |
| $FPR^2_{(3)}$ | — | — | — | — | — | — | — | — | $FS_j$ | $FS_b$ |
| $FPR^2_{(2)}$ | — | — | — | — | — | — | — | — | — | $FS_a$ |
| $FPR^2_{(1)}$ | — | — | — | — | — | — | — | — | — | — |

*Fig 2*

|        | CPR(1) | CPR(2) | CPR(3) | CPR(4) |
|--------|--------|--------|--------|--------|
| CT(4)  | CS m   | CS n   | CS o   | CS p   |
| CT(3)  | CS i   | CS j   | CS k   | CS l   |
| CT(2)  | CS e   | CS f   | CS g   | CS h   |
| CT(1)  | CS a   | CS b   | CS c   | CS d   |

*Fig 3*

METHOD AND SYSTEM OF DETERMINING LIFE OF TURBOCHARGER

TECHNICAL FIELD

The present invention relates generally to rotational compressors, and more particularly to a method and a system of determining a life of a turbocharger.

BACKGROUND

Engineers have long known that turbochargers are subjected to stresses that limit the life of the turbocharger. Specifically, the life of a turbocharger is limited by both low cycle fatigue and creep on a compressor wheel and a turbine wheel of the turbocharger. Low cycle fatigue results from acceleration of the turbocharger during load changes. When the turbocharger rotational speed increases, the centrifugal forces acting on material comprising rotors of the turbocharger compressor wheel and turbocharger turbine wheel may cause the material to expand. However, when the turbocharger rotational speed decreases, the same material may contract. The repeated expansion and contraction of the material comprising the compressor and turbine wheel rotors will cause fatigue, which may eventually lead to turbocharger failure.

Further, the life of a turbocharger is limited by creep. Creep is the slow movement of the material comprising the compressor and turbine wheels under high stress of high turbocharger rotational speeds and high inlet air or exhaust temperature. The material will deform and loose strength at an increasing rate as the stress and temperature increases. The onset temperature of creep differs among materials. Although the turbine wheel and compressor wheel may be comprised of different materials and operate at different temperatures, creep can eventually cause both the compressor and turbine wheels to fail.

Moreover, a turbocharger's resistance to creep and fatigue can be reduced by material degradation of the compressor and turbine wheels. The material properties can deteriorate due to the metallurgical changes, such as oxidation or corrosion, when subjected to high temperatures for a period of time. Although the turbine wheel and the compressor wheel may be comprised of different materials and operate at different temperatures, material degradation can contribute to failure caused by fatigue and creep in both the compressor and turbine wheels.

Because turbocharger fatigue and creep are caused by the operating conditions of the turbocharger, the life of the turbocharger is directly related to how the turbocharger is used, which is often referred to as the "duty cycle" of the turbocharger. Turbochargers are used in a variety of vehicle and stationary applications powered by internal combustion engines. Further, turbochargers that have similar applications may also be exposed to different turbocharger operating conditions depending on the duty cycle of the turbocharger. Thus, because there are many different applications and duty cycles of turbochargers, the life of a particular turbocharger can vary substantially from the average life of similar turbochargers.

Because fatigue and creep will eventually cause the turbocharger to fail, the turbocharger must be replaced or serviced prior to failure. Thus, there must be a determination of when the turbocharger will fail. Often, a representative duty cycle is used to estimate when the turbocharger should be replaced. The representative duty cycle refers to the life of a turbocharger being used in an average manner. However, because turbochargers have many different applications, using a representative duty cycle to predict the lives of various turbochargers leads to over estimation of some turbochargers' lives and under estimation of other turbochargers' lives. If the representative duty cycle over estimates the life of the turbocharger, the turbocharger will fail prior to being replaced, resulting in costly repairs and customer inconvenience. If the representative duty cycle under estimates the life of the turbocharger, the turbocharger will be unnecessarily replaced, resulting in unnecessary expense and inconvenience.

Thus, another method of determining the life of a turbocharger has been to directly monitor the rotational speed of the turbocharger and the turbine wheel inlet temperature. For instance, the turbocharger fatigue life monitor, shown in U.S. Pat. No. 6,209,390 B1, issued to LaRue et al., on Apr. 3, 2001, includes at least one sensor that measures the actual operating condition of the turbocharger, i.e., the rotational speed of the turbocharger. A central processing unit can compare the actual operating condition of the turbocharger with predetermined data to determine when service of the turbocharger is needed.

Although the method of monitoring the actual operating condition reduces the over estimation and under estimation concerns, there are additional costs involved with direct monitoring of the turbocharger operating condition. For instance, there are costs associated with the assembly and installation of turbocharger rotational speed sensors and connections between the computer processor and the sensors. Specifically, the design of the turbocharger shaft may require alteration in order to permit measurement of its rotational speed.

Moreover, the LaRue fatigue life monitor only monitors an estimated fatigue life of the turbine and compressor wheel, and does not monitor the creep life of the wheels. Depending on the duty cycle of the turbocharger, the turbocharger life may be limited by creep rather than by fatigue. Similarly, the LaRue fatigue life monitor does not consider the effect of possible material degradation when determining the fatigue life of the turbine and compressor wheels.

The present invention is directed to overcoming one or more of the problems as set forth above.

SUMMARY OF THE INVENTION

In one aspect of the present invention, a turbocharger life determining system includes a turbocharger, at least one compressor inlet pressure sensor, at least one compressor outlet pressure sensor, and an electronic control module including a turbocharger life determining algorithm. The compressor inlet pressure sensor and the compressor outlet pressure sensor are in communication with the electronic control module. The turbocharger life determining algorithm is operable to determine the life of the turbocharger, at least in part, based on a relationship between the sensed compressor inlet pressure and the sensed compressor outlet pressure.

In another aspect of the present invention, an article includes a computer readable data storage medium including a turbocharger life determining algorithm. The turbocharger life determining algorithm is operable to determine the life of the turbocharger, in part, based on a relationship between a sensed compressor inlet pressure and a sensed compressor outlet pressure.

In yet another aspect of the present invention, a method of determining a life of a turbocharger includes a step of monitoring at least one of fatigue and creep of at least one component of the turbocharger, at least in part, by sensing at least one parameter correlated to an estimated turbocharger rotational speed. The monitored fatigue and the monitored creep is compared to a predetermined fatigue criteria and a predetermined creep criteria, respectively.

BRIEF DESCRIPTION OF THE DRAWINGS

FIG. 2 is a matrix illustrating stored data included within a fatigue monitoring algorithm, according to the present invention; and FIG. 3 is a matrix illustrating stored data included within a creep monitoring algorithm, according to the present invention.

DETAILED DESCRIPTION

Figure 1:
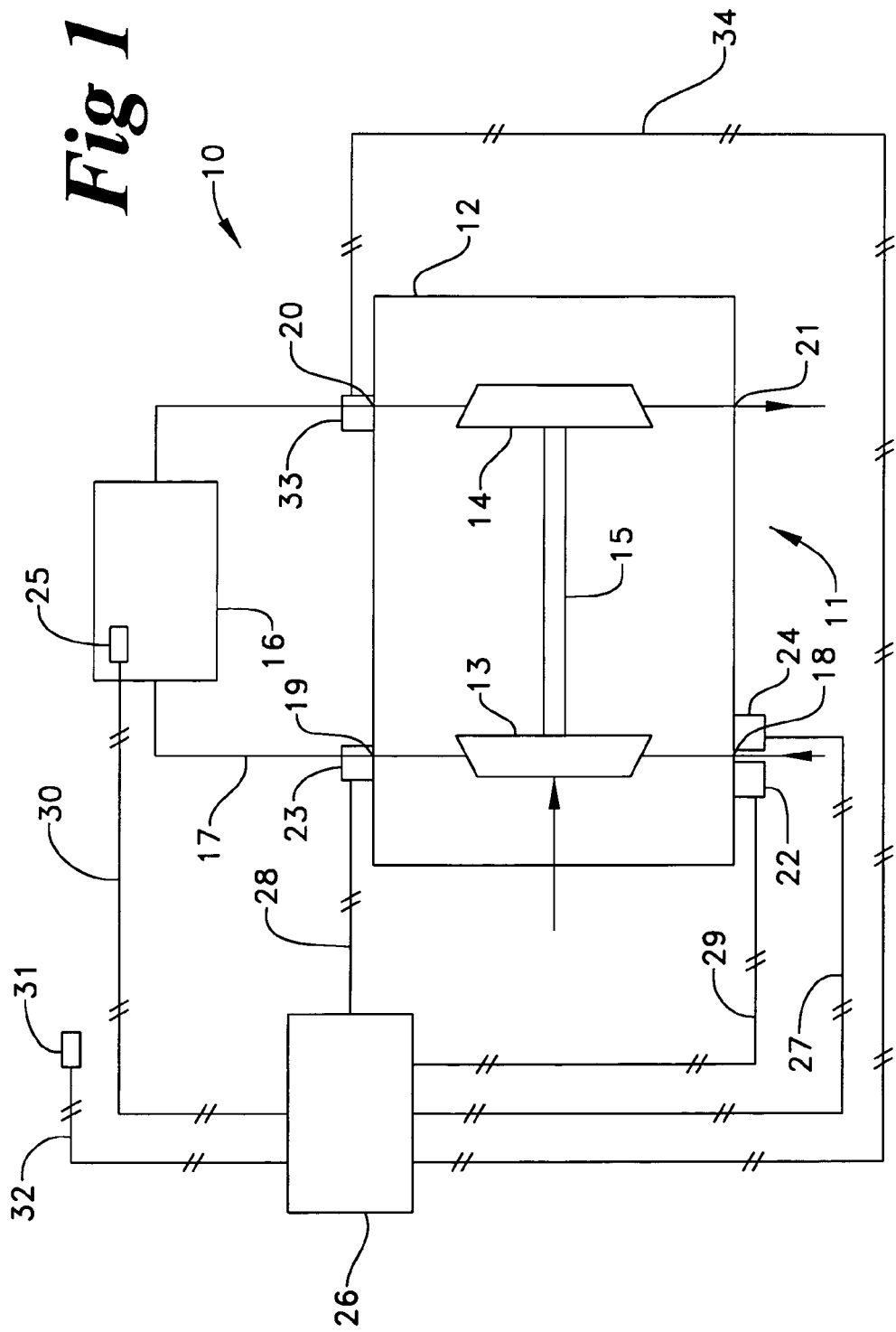
FIG. 1 is a schematic representation of a turbocharger life determining system, according to the present invention.

Referring to FIG. 1, there is shown a schematic representation of a turbocharger life determining system, according to the present invention. The turbocharger life determining system 10 includes a turbocharger 11 mounted within a turbocharger housing 12. The turbocharger 11 includes a compressor wheel 13 and a turbine wheel 14 connected by a shaft 15 in a conventional manner. Air is circulated through the turbocharger 11 and an engine 16 via an air line 17. The turbocharger housing 12 defines a compressor inlet 18, a compressor outlet 19, a turbine inlet 20, and a turbine outlet 21. A compressor inlet pressure sensor 22 is illustrated as attached to the housing 12, although the compressor inlet pressure sensor 22 could be positioned at various points within the inlet air line upstream from the compressor inlet 18. Although the compressor outlet pressure sensor 23 is illustrated as attached to the turbocharger housing 12, it should be appreciated that the compressor outlet pressure sensor 23 could be positioned at various points within the air line 17 between the compressor outlet 19 and the inlet of engine 16, or could be positioned at the inlet of the engine 16. Preferably, a compressor temperature sensor 24 is attached to the housing 12 at the compressor inlet 18, a speed sensor 25 is positioned within the engine 16 in a conventional manner to determine engine speed, and a turbine inlet temperature sensor 33 is positioned on the housing 12 near the turbine inlet 20. The compressor inlet pressure sensor 22, the compressor outlet pressure sensor 23, the compressor inlet temperature sensor 24, the engine speed sensor 25, and the turbine temperature sensor 33 are in communication with an electronic control module 26 via the inlet pressure communication line 27, the outlet pressure communication line 28, the compressor temperature communication line 29, the engine speed communication line 30, and the turbine temperature communication line 34, respectively. The electronic control module 26 is preferably in communication with a turbocharger life indicator 31 via an indicator communication line 32.

The electronic control module 26 preferably includes a turbocharger life determining algorithm being operable to estimate the life of the turbocharger 11, in part, based on a relationship between a sensed compressor inlet pressure and a sensed compressor outlet pressure. The relationship may be illustrated as a ratio of the sensed compressor inlet pressure and the sensed compressor outlet pressure, which is correlated to turbocharger speed. It should be appreciated that the sensed pressures are absolute pressures. The sensed compressor inlet to compressor outlet pressure ratio will be herein referred to as the calculated pressure ratio. Those skilled in the art will appreciate that a pressure differential sensor between the compressor inlet 18 and the compressor outlet 19 could be substituted for at least one of the pressure sensors 22 and 23. Although the turbocharger life determining algorithm is included within the electronic control module 26, the present invention contemplates the turbocharger life determining algorithm as being included within any article that includes a computer readable data storage medium. The turbocharger life determining algorithm preferably includes a fatigue monitoring algorithm and creep monitoring algorithm. The fatigue monitoring algorithm is operable to monitor the fatigue in at least one of the turbocharger components. According to the present invention, the fatigue monitoring algorithm monitors the fatigue in the compressor wheel 13 and the turbine wheel 14, although it should be appreciated that fatigue in only one of the wheels 13 or 14 could be monitored.

A range of the calculated pressure ratios for an entire operating range of the turbocharger 11 is separated into multiple fatigue subset ranges of calculated pressure ratios. The fatigue monitoring algorithm includes the fatigue subset ranges of the calculated pressure ratio. Although the number of fatigue subset ranges can vary among turbochargers, the present invention is illustrated as including fatigue subset ranges one through ten, with fatigue subset range one including the smallest pressure ratio over the operating range of the turbocharger 11. Those skilled in the art will appreciate that an increased number of fatigue subset ranges will result in a more accurate fatigue monitoring algorithm. However, it is also appreciated that the number of fatigue subset ranges is limited by the storage capacity of the electronic control module 26.

Each pressure ratio correlates with a turbocharger rotational speed. The relationship between pressure ratio and turbocharger rotational speed is known in the art. In general, the greater the pressure ratio, the greater the turbocharger rotational speed. Although the pressure ratio is the preferred sensed parameter correlated with the turbocharger rotational speed, there are other parameters, included but not limited to, a ratio of compressor inlet temperature to compressor outlet temperature, a ratio of turbine inlet temperature to turbine outlet temperature, and engine speed in combination with air flow velocity to and/or from the compressor wheel, that also correlate to the turbocharger rotational speed. Although other parameters correlating to turbocharger rotational speed can be used rather than, or in addition to, the calculated compressor inlet/outlet pressure ratio, the pressure ratio has been found to provide an accurate estimation of the turbocharger rotational speed and may not require installation of additional sensors. The compressor inlet and outlet pressure sensors 22 and 23 often are included in existing control systems.

Because each pressure ratio correlates to a turbocharger rotational speed, each fatigue subset range of calculated pressure ratios correlates with a range of turbocharger rotational speed. Although the fatigue subset ranges can be established solely on pressure ratios, preferably, the fatigue subset ranges are established based on additional sensed parameters in order to more accurately reflect the turbocharger rotational speed. In the present invention, the establishment of the fatigue subset ranges is preferably based also on sensed compression inlet temperatures and sensed engine speeds. The relationships between turbocharger rotational speed and engine speed and compressor inlet temperature are known in the art. For instance, it is known that a pressure ratio at a lower compressor inlet temperature may correlate to a slower turbocharger rotational speed than would the same pressure ratio at a warmer temperature.

Although the relationship between the turbocharger rotational speed and the sensed parameters, i.e., the pressure ratio, the engine speed and the compressor inlet temperature, is preferably incorporated into the fatigue monitoring algorithm by engineers establishing the subset ranges prior to being downloaded onto the electronic control module 26, the present invention contemplates the correlation between the turbocharger speed and the sensed parameters being incorporated into the fatigue monitoring algorithm through an additional step performed within the electronic control module 26. For instance, the fatigue monitoring algorithm could convert the calculated pressure ratio at the sensed inlet temperature and engine speed into the turbocharger rotational speed. The turbocharger rotational speed could be separated into subset ranges of rotational speeds. Further, the present invention contemplates that other sensed parameters, in addition to pressure ratio, engine speed, and compressor inlet temperature, may be monitored to even further improve the accuracy of the turbocharger rotational speed estimation.

The fatigue monitoring algorithm is operable to monitor transition cycles between the fatigue subset ranges of the turbocharger 11. For purposes of the present invention, a transition cycle is monitored increase of the calculated fatigue pressure ratio between fatigue subset ranges. However, it should be appreciated that the transition cycle could be a monitored increase or decrease of any parameter correlated to turbocharger rotational speed. A transition cycle begins when the calculated pressure ratio increases from a fatigue subset range to the adjacent higher fatigue subset range. The calculated pressure ratio cannot skip an adjacent fatigue subset range. For purposes of this description, the lowest fatigue subset range of a transition cycle will be referred to as the starting fatigue subset range ($FPR^1$ shown in FIG. 2). As long as the pressure ratio remains within the same fatigue subset range or increases in fatigue subset ranges, the transition cycle continues. The transition cycle ends when the calculated pressure ratio decreases in fatigue subset ranges. For purposes of this description, the highest fatigue subset range will be referred to as the ending fatigue subset range ($FPR^2$ shown in FIG. 2). A new transition cycle begins when the pressure ratio again increases. For instance, if the monitored pressure ratio increased from fatigue subset range one to fatigue subset range two, the transition cycle begins. If the pressure ratio then continues to increase from fatigue subset range two to subset range eight, the transition cycle continues. But, if the pressure ratio decreases to fatigue subset range eight back to fatigue subset range seven, the transition cycle is completed.

Referring to FIG. 2, there is shown a matrix illustrating the stored data included within the fatigue monitoring algorithm, according to the present invention. The possible starting fatigue subset ranges ($FPR^1_{(1)-(10)}$) and the possible ending fatigue subset ranges ($FPR^2_{(1)-(10)}$) are listed on the vertical and horizontal axis, respectively. Each box is defined by a starting fatigue subset range ($FPR^1$) and an ending fatigue subset range ($FPR^2$), and thus, represents a transition cycle of a particular size. In the illustrated example, there is a possibility of forty-five different sizes of transition cycles, and thus, there are forty-five open boxes, or storage points. The fatigue monitoring algorithm will count the number of transition cycles within each box. Each of the forty-five sizes of transition cycles includes a particular predetermined fatigue rating. The fatigue rating of the transition cycle depends on the size of the transition between the fatigue subset ranges and the pressure ratios at which the transition cycle is occurring. For instance, a transition cycle from fatigue subset range one ($FPR^1_{(1)}$) to eight ($FPR^2_{2(8)}$) will have a higher fatigue rating than a transition cycle from fatigue subset range one ($FPR^1_{(1)}$) to four ($FPR^2_{(4)}$). However, a transition cycle from fatigue subset range seven ($FPR^1_{(7)}$) to fatigue subset range nine ($FPR^2_{(9)}$) will include a higher fatigue rating than will the transition cycle from fatigue subset range five ($FPR^1_{(5)}$) to fatigue subset range seven ($FPR^2_{(7)}$). The product of the fatigue rating and the number of transition cycles within the respective box results in a fatigue stress damage ($FS_{a-tt}$) caused by that particular size of transition cycles. The fatigues stress damages ($FS_{a-tt}$) will be stored and updated. The sum of the fatigue stress damage for each particular transition cycle will result in the monitored fatigue of the turbocharger 11.

Those skilled in the art will appreciate that stress damage caused by the transition cycle may also be a factor of the time over which the transition cycle occurs. The quicker the acceleration of the turbocharger 11, the more stress, especially temperature gradient induced stress, may be caused by the transition cycle. Although the present invention contemplates time being included in the fatigue monitoring algorithm of an electronic control module having sufficient processing and storage capabilities, the present invention is illustrated without factoring time being that the speed of the acceleration is less significant of a factor than the size of the acceleration, especially when monitoring creep within the compressor wheel 13.

The turbocharger life determining algorithm also includes a creep monitoring algorithm being operable to monitor the creep within at least one component of the turbocharger 11. Similar to the fatigue monitoring algorithm, the present invention monitors the creep within the compressor wheel 13 and the turbine wheel 14, although it could monitor the creep within only one of the wheels 13 and 14. The creep monitoring algorithm monitors the creep by monitoring the amount time during which the turbocharger 11 operates at different combinations of calculated pressure ratio and sensed compressor and turbine inlet temperature. Similar to the fatigue monitoring algorithm, the calculated pressure ratios are preferably adjusted by the sensed engine speed and sensed compressor inlet temperature. The creep monitoring algorithm will preferably also monitor the compressor inlet temperature and the turbine inlet temperature. Because there is a relationship known in the art between compressor inlet temperature, compressor outlet temperature and the compressor pressure ratio, the creep monitoring algorithm can monitor the compressor outlet temperature by monitoring the pressure ratio and compressor inlet temperature. Further, the turbine inlet temperature can be inferred from the sensed exhaust pressure exiting the engine 16, engine fuel rate, or engine load and manifold pressure. Those skilled in the art will appreciate that many control systems will include exhaust pressure sensors. However, it is preferred that the turbocharger life determining system 10 includes the compressor inlet temperature sensor 24 which can directly sense the compressor inlet temperature and communicate such to the electronic control module 26. In addition, it is preferred that the turbocharger life determining system 10 includes the turbine inlet temperature sensor 24 which can directly sense the turbine inlet temperature and communicate such to the electronic control module 26.

Similar to the fatigue monitoring algorithm, the creep monitoring algorithm includes multiple creep pressure ratio subset ranges. However, the creep monitoring algorithm also includes multiple compressor inlet temperature subset ranges and multiple turbine inlet temperature subset ranges.

Although the present invention is illustrated as including four creep pressure ratio subset ranges, four compressor inlet temperature subset ranges, and four turbine inlet temperature subset ranges, it should be appreciated that there could be any number of subset ranges. The creep pressure ratio subset ranges are established similarly to the fatigue subset ranges. However, because creep primarily occurs at relatively high pressure ratios, the lowest creep subset range, subset range one, includes all the pressure ratios in which creep does not generally occur. In addition, because creep mostly occurs at relatively high temperatures, the lowest compressor and turbine inlet temperature subset ranges, will include compressor inlet and turbine inlet temperatures at which creep does not generally occur.

Although the pressure ratios at which creep occurs may vary among turbochargers, the onset of creep generally occurs at a calculated pressure ratio of approximately 70% of the maximum possible pressure ratio. Although the inlet temperatures at which creep occurs may vary among turbochargers, the onset of creep generally occurs within the compressor wheel 13 at approximately 20° C. and above, and generally occurs within the turbine wheel 14 at approximately 400° C. and above. Thus, creep pressure ratio subset range number one may include pressure ratios between 0–70% of the maximum pressure ratio, compressor inlet temperature subset range one may include temperatures below 20° C., and turbine inlet temperature subset range may include temperatures below 400° C. The remaining pressure ratios and temperatures over the turbocharger operating range can be equally separated into the respective subset ranges two through three. For instance, there are four creep subset ranges. The first will include pressure ratios from 0–70% of the maximum pressure ratio, the second creep subset range will include pressure ratios that are 71–80% of the maximum pressure ratio, the third will include pressure ratios that are 81–90% of the maximum pressure ratio, and the fourth will include pressure ratios that are 91–100%.

Referring to FIG. 3, there is shown a matrix illustrating the stored data included within the creep monitoring algorithm, according to the present invention. Creep subset ranges ($CPR_{(1)}$–$CPR_{(4)}$) and creep compressor inlet temperature subset ranges ($CT_{(1)}$–$CT_{(4)}$) are illustrated along the horizontal and vertical axis, respectively. For purposes of this discussion, FIG. 3 will be discussed for the compressor wheel 12. However, it should be appreciated that a spread sheet illustrating the creep of the turbine wheel 13 would be similar to FIG. 3 except that it would include the turbine inlet temperature and turbine creep stress damage rather than the compressor inlet temperature and compressor creep stress damage. Each box in FIG. 3 is defined by a compressor inlet temperature ($CT_{(1)-(4)}$) and a creep subset range ($CPR_{(1)-(4)}$). Thus, each box is a storage point for a combination of compressor inlet temperature subset range and creep subset range. There are sixteen different combinations at which the illustrated compressor 13 can operate. The creep monitoring algorithm will determine the combination at which the compressor 13 is operating and monitor the amount of time that the turbocharger 11 operates at that particular combination of compressor inlet temperature subset range (CT) and creep subset range (CPR). Each box, or combination, includes a creep rating caused by the temperature and calculated pressure ratio. The creep rating represents the stress on the compressor wheel 13 caused by that particular combination, and can be determined by methods known in the art. The higher the compressor inlet temperature and the pressure ratio, the greater the rating. The product of the time spent at a particular combination and the creep rating will result in the creep stress damage ($CS_{a-q}$) caused by the turbocharger 11 operating at each particular combination. The sum of the creep stress damage ($CS_{a-q}$) is the monitored creep for the compressor wheel 13.

Preferably, both the fatigue monitoring algorithm and the creep monitoring algorithm include a material degradation algorithm that is operable to monitor the material degradation in both the compressor wheel 13 and the turbine wheel 14. However, it should be appreciated that the present invention contemplates the fatigue and creep monitoring algorithm without the material degradation algorithm, or a fatigue and creep monitoring algorithm in which the material degradation algorithm only monitors the material degradation within one of the wheels 13 and 14. Preferably, the material degradation algorithm monitors the material degradation within the compressor wheel 13 and the turbine wheel 14 by monitoring the amount of time during which each wheel 13 and 14 operates at the sensed compressor inlet and turbine inlet temperatures, respectively. Although the present invention contemplates various methods of monitoring the amount of time each component 13 and 14 operates at different inlet temperatures, it should be appreciated that the material degradation algorithm can monitor the material degradation by the use of degradation temperature subset ranges. The material degradation algorithm can include any number of compressor inlet and turbine inlet temperature subset ranges. The greater the processing and storage capabilities of the electronic control module 26, the more subset ranges possible and the more accurate the material degradation algorithm. Each temperature subset range will include a material degradation rating. Those skilled in the art will appreciate that the material degradation rating will be greater at higher temperature subset ranges. Further, it should be appreciated that the material degradation ratings for the compressor wheel 13 and the turbine wheel 14 will be different being that the wheels 13 and 14 are made from different materials. The product of the time the particular turbocharger component 13 or 14 operates within the specific degradation temperature subset range and the material degradation rating will equal the material degradation caused to the particular component 13 or 14. The sum of the material degradation within each degradation temperature subset range for the compressor wheel 13 is the monitored material degradation of the compressor wheel 13. Similarly, the sum of the material degradation within each temperature subset range for the turbine wheel 14 is the monitored material degradation of the turbine wheel 14. The monitored material degradation of each component 13 and 14 can be continually updated.

The monitored material degradation for each wheel 13 and 14 is preferably incorporated into the monitored creep and the monitored fatigue of each wheel 13 and 14. As the monitored material degradation of each wheel 13 and 14 increases, the resistance of the material comprising each wheel 13 and 14 against creep and fatigue may be reduced. Therefore, failure of the compressor and turbine wheels 13 and 14 due to creep and/or fatigue may be more likely due to material degradation within the compressor and turbine wheels 13 and 14. Although there are various methods of incorporating material degradation into the determination of the turbocharger life, one possible method is to incorporate the monitored material degradation into the creep stress damage ($CS_{a-m}$) for each combination of the temperature and pressure ratio and the fatigue stress damage ($FS_{a-tt}$) for each transition cycle. For instance, after the creep monitoring algorithm determines the creep stress damage caused by the time the compressor wheel operated at a particular combination of inlet temperature and pressure ratio, the material degradation algorithm can adjust the newly determined creep stress damage for the particular combination by the monitored material degradation of the compressor wheel. After the newly monitored creep stress damage is adjusted to incorporate the monitored material degradation, the stored creep stress damage (CS) for the particular combination can be updated with the newly monitored and adjusted creep stress damage. It should be appreciate that the relationship between material degradation and the stress damage caused by creep and fatigue is known in the art.

The turbocharger life determining algorithm preferably includes a comparing algorithm being operable to compare the monitored fatigue and the monitored creep with a predetermined fatigue criteria and predetermined creep criteria, respectively. The present invention is illustrated as including four sets of predetermined criteria, being a fatigue criteria and creep criteria for each wheel 13 and 14. However, it should be appreciated that there could be eight sets of predetermined criteria. In addition to the predetermined fatigue and creep criteria, the turbocharger life determining algorithm could include a predetermined material degradation criteria and a combined predetermined creep and fatigue criteria. The predetermined material degradation criteria is the predetermined material degradation that each of the wheels 13 and 14 can withstand without probable failure. The predetermined fatigue criteria includes predetermined stress damage caused by the transition cycles that the particular turbocharger component 13 or 14 can withstand without probable failure. The predetermined creep criteria includes predetermined stress damage caused by the pressure ratios and inlet temperatures that the particular component 13 or 14 that the turbocharger 11 can withstand without probable failure. There must be different predetermined creep and fatigue criteria for the compressor wheel 13 and the turbine wheel 14 due to the different operating conditions of and the different materials comprising each wheel 13 and 14. The compressor wheel 13 is preferably comprised of aluminum, although it can be comprised of various other materials, including but not limited to, titanium and steel. The turbine wheel 14 is preferably made from high nickel alloy, but could be any suitable material including but not limited to ceramic or titanium aluminide. Further, the turbine wheel 14 generally operates at a substantially hotter temperature than the compressor wheel 13. However, it should be appreciated that a combined stress damage due to fatigue and creep could also be evaluated for each component 13 and 14 by calculation methods known in the art, including but not limited to, linear damage accumulation.

The predetermined criteria is preferably included within the computer readable storage medium of the electronic control module 26. When the sensed fatigue of either one of the wheels 13 and/or 14 exceeds the predetermined fatigue criteria of the respective wheel 13 and/or 14, the electronic control module 26 will signal the turbocharger life indicator 31 via the indicator communication line 32. The turbocharger life indicator 31 can include either a visual or audio cue, and is preferably positioned at a point the operator can readily view or hear the cue, such as on an operator's display panel. The indicator 31 preferably indicates which component 13 or 14 has exceeded which predetermined criteria, either the fatigue or creep criteria. However, the present invention contemplates the predetermined fatigue and creep criteria being included on a service tool that can read the monitored fatigue and creep of the turbocharger life determining algorithm. The service tool could compare the monitored fatigue and creep to the predetermined fatigue and creep. Regardless of whether the monitored fatigue and creep is compared to the predetermined fatigue and creep within the electronic control module 26 or the service tool, the present invention contemplates the electronic control module 26 and the service tool indicating the remaining life, if any, of the turbocharger 11. Further, the monitored fatigue and creep could be downloaded by the service tool, and the technician or mechanic could compare the monitored fatigue and monitored creep with the predetermined fatigue criteria and predetermined creep criteria.

Once the turbocharger 11 has been replaced, the cumulative and individual stress damage to the turbine and compressor wheels 14 and 13 are important in determining whether the components 13 and 14 can be reused in a remanufactured turbocharger. Thus, it is necessary to record the cumulative, fatigue and the creep damage of each component. There are various methods of recording the turbocharger life information, including but not limited to, manually writing or "punching out" the fatigue, creep and cumulative values for each component 13 and 14 on the turbocharger 11, transferring the values to a memory chip located on the turbocharger 11, or saving the values in a service tool for subsequent research.

INDUSTRIAL APPLICABILITY

Referring to FIG. 1, the present invention will be described for the operation of the turbocharger 11 within a vehicle including an internal combustion engine, although it should be appreciated that the operation of the turbocharger 11 would be similar in any application. Further, the present invention will be described for an engine including one turbocharger, although it should be appreciated that the present invention could apply to an engine including multiple turbochargers. In order to monitor the life of each turbocharger, each turbocharger can be identified within the electronic control module by its identifying characteristics, including but not limited to, the turbocharger's location on the engine, serial number, and manufacturing date. Preferably, the turbocharger location, serial number and date is stored within the electronic control module to protect against the turbocharger being replaced without the turbocharger life monitoring algorithm being reset.

As the turbocharger 11 operates, the compressor inlet pressure sensor 22 and the compressor outlet pressure sensor 23 will periodically sense the pressure of the air flowing into the compressor inlet 18 and the air flowing out of the compressor outlet 19, respectively. The pressures are communicated to the electronic control module 26 via the inlet pressure sensor communication line 27 and the outlet pressure sensor communication line 28. Further, the compressor inlet temperature sensor 24, the turbine inlet temperature sensor 33, and the engine speed sensor 25 will periodically sense the temperature of the air flowing into the compressor inlet 18, into the turbine inlet 20, and the speed of the engine 16, respectively. Although the time interval between which the pressure sensors 22, 23, 24, 25, and 33 sense their respective parameters and communicate such to the electronic control module 26 can vary, it should be appreciated that the time interval should be sufficiently short such that transitions in the sensed parameters can be detected in order to accurately calculate transitions in the estimated turbocharger rotational speed. For instance, in the illustrated example, the time interval is approximately 0.01–0.05 seconds.

The sensed temperatures and the sensed engine speed are communicated to the electronic control module 26 via the compressor temperature communication line 29, the turbine temperature communication line 34 and the engine speed communication line 30, respectively. Generally, because other monitoring and control systems within the vehicle or work machine require data concerning engine speed and pressures and temperatures throughout the air line 17, the engine speed sensor 25, the pressure sensors 22 and 23, and the temperature sensors 24 and 33 generally exist in most vehicles and work machines, or the sensed parameters can be inferred from existing sensors. For instance, the turbine inlet temperature could be inferred from fuel rate and compressor outlet pressure. Thus, the installation of new sensors and communication lines may not be required.

As the electronic control module 26 receives the sensed parameters, the fatigue monitoring algorithm of the turbocharger life determining algorithm monitors the data in the ten fatigue subset ranges correlated to ten ranges of estimated turbocharger rotational speed. The turbocharger life determining algorithm will determine which fatigue subset range that the calculated compressor inlet to outlet pressure ratio at the sensed compressor inlet temperature and at the sensed engine speed falls. The present invention contemplates that the fatigue monitoring algorithm adjusts the calculated pressure ratio by the engine speed and the compressor inlet temperature to more accurately reflect the turbocharger rotational speed by various processes known in the art. Further, the present invention contemplates that, in applications in which the storage capacity of the electronic control module 26 permits, the pressure ratio can be adjusted by even additional sensed parameters that can result in a more accurate estimation of the turbocharger rotational speed. In a simple version, the present invention also contemplates the pressure ratio being the only sensed parameter.

Referring also to FIG. 2, the fatigue monitoring algorithm will continue to monitor the sensed parameters and count the transition cycles that fall within each of the forty-five storage points, or boxes. Each transition cycle is the monitored increase between fatigue subset ranges. When the calculated pressure ratio increases into a larger fatigue subset range, such as from fatigue subset range four ($FPR^1_{(4)}$) to fatigue subset range five ($FPR^1_{(5)}$), the fatigue monitoring algorithm will begin to monitor the transition cycle. As long as the calculated pressure ratio remains within the same fatigue subset range or in a larger fatigue subset range, the transition cycle will continue. Thus, if the pressure ratio stayed within fatigue subset range five and then increased to fatigue subset range nine, the transition cycle would continue. When the calculated pressure ratio, adjusted by the sensed engine speed and sensed inlet temperature, falls within a fatigue subset range smaller than the fatigue subset range in which the previously sensed pressure ratio was monitored, the transition cycle will be completed. Therefore, if the calculated pressure ratio falls to fatigue subset range eight, the transition cycle is completed, and fatigue subset range nine ($FPR^2_{(9)}$) is the ending fatigue subset range. Thus, the transition cycle will be counted within the storage point defined by starting fatigue subset range four ($FPR^1_{(4)}$) and ending fatigue subset range ($FPR^2_{(9)}$) and including fatigue stress damage ($FS_{dd}$). The fatigue monitoring algorithm will count the number of completed transition cycles in each of the forty-five boxes, or storage points, and convert the number into the fatigue stress damage (FS) for the respective storage point by multiplying the number of transition cycles with the fatigue rating for the storage point. There preferably is a different fatigue rating for each of the forty-five sizes of transition cycles corresponding to the forty-five storage points. The fatigue monitoring algorithm will continually monitor the transition cycles, and store and update the fatigue stress damage (FS) caused by each completed transition cycles. Before updating the fatigue stress damage (FS), the material degradation algorithm will preferably incorporate the monitored material degradation into the newly monitored fatigue stress damage. Thus, the updated fatigue stress damage (FS) will more accurately reflect the life of the turbocharger component 13 or 14.

Referring also to FIG. 3, the creep monitoring algorithm monitors the creep within the compressor and turbine wheels 13 and 14, at least in part, by monitoring sensed parameters that correlate to turbine rotational speed, compressor inlet temperature, and turbine inlet temperature. Similar to the fatigue monitoring algorithm, as the electronic control module 26 receives the sensed compressor inlet pressure, the sensed compressor outlet pressure, the sensed engine speed, and the sensed compressor inlet temperature, the creep monitoring algorithm will determine the calculated pressure ratio. The creep monitoring algorithm will then monitor the creep pressure ratio subset range (CPR). As the electronic control module 26 receives the sensed compressor inlet temperature and the sensed turbine inlet temperature, the creep monitoring algorithm will monitor the compressor inlet temperature subset range and the turbine inlet temperature subset range. Thus, the creep monitoring algorithm can determine the combination of compressor inlet temperature subset range (CT) and creep subset range (CPR) at which the turbocharger 11 is operating to determine the creep of the compressor 13, and will monitor the combination of turbine inlet temperature (not shown) and the turbine subset range (not shown) at which the turbocharger 11 is operating to determined the creep of the turbine 14.

The creep monitoring algorithm will then monitor the amount of time the compressor wheel 13 continues to operate within the same combination of creep pressure ratio subset range (CPR) and compressor inlet temperature subset range (CT). Although not illustrated in FIG. 3, the creep monitoring algorithm will also monitor the amount of time the turbine wheel 14 continues to operate within the same combination of creep pressure ratio subset range and turbine inlet temperature subset range. The amount of time within a certain combination will be multiplied with the creep rating for that particular combination to determine the creep stress damage (CS) being placed on the particular wheel 13 and 14 at that particular combination. For each of the sixteen possible combinations corresponding to the sixteen boxes, or storage points, there will preferably be a different creep rating. The creep monitoring algorithm can thus store and update the amount of stress being placed on each wheel 13 and 14 due to each sensed combination. However, before updating the creep stress damage (CS), the material degradation algorithm will preferably incorporate the monitored material degradation of the particular component 13 or 14 to the newly monitored creep stress damage. Thus, the updated creep stress damage (CS) will more accurately reflect the life of the components 13 or 14. The sum of the stress on the compressor wheel 13 and the sum of the stress on the turbine wheel 14 caused by the combinations will be continually updated as the turbocharger 11 continues to operate.

Preferably as the fatigue and creep are being monitored, the turbocharger life determining algorithm will periodically compare the monitored fatigue and monitored creep to the predetermined fatigue criteria and predetermined creep criteria of the turbocharger component, respectively. The monitored fatigue and creep will be compared against four criteria: (1) the compressor wheel fatigue criteria; (2) the compressor wheel creep criteria; (3) the turbine wheel fatigue criteria; and (4) the turbine wheel creep criteria. It should be appreciated that the monitored material degradation and calculated combined creep and fatigue could also be compared against the predetermined material degradation and the predetermined combined creep and fatigue of each wheel 13 and 14, respectively. Further, it should be appreciated that the comparison could occur at any time interval that will provide sufficient warning to prevent turbocharger failure. Although the comparison could be made by the service technician or a service tool during routine maintenance, the turbocharger preferably includes the comparing algorithm that is operable to make the comparison.

The combination of the number of transition cycles and the stress damage caused by the transition cycles will result in the monitored fatigue. If the turbocharger 11 has been operated within a small range of turbocharger rotational speeds, there will be less stress, and thus less fatigue on the components, for the same time period as a turbocharger 11 that was subjected to accelerations and de-accelerations over a larger operating range. Further, the turbocharger 11 undergoing accelerations and de-accelerations between relatively high speeds and temperatures will suffer from more stress damage than the turbocharger operating at lower speeds and temperatures. In addition, the sum of the stress caused by the amount of time the turbocharger operated at each combination of compressor inlet temperature subset range and creep subset range will result in the monitored creep for the compressor wheel. Similarly, the sum of the stress caused by the amount of time the turbocharger operated at each combination of turbine inlet temperature subset range and creep subset range will result in the monitored creep for the turbine wheel. The higher the inlet temperature and the higher the pressure ratio, the more stress damage.

When the comparing algorithm determines at least one of the monitored fatigue and the monitored creep equals a predetermined fatigue criteria or the predetermined creep criteria for one of the compressor wheel 13 or the turbine wheel 14, the electronic control module 26 will communicate to the turbocharger life indicator 31 via the indicator communication line 32. The turbocharger life indicator 31 will either visually or audibly indicate to the operator that the turbocharger 11 requires maintenance. Because predetermined creep or fatigue in only one of the wheels 13 or 14 could result in failure of the turbocharger 11, the indicator 31 will be activated when only one of the four criteria is reached, and preferably, will alert the operator as to the reason for the failure and which component 13 or 14 may need maintenance. It should be appreciated that, even if the monitored creep and fatigue do not exceed the predetermined creep and fatigue, the electronic control module 26 could communicate to the turbocharger life indicator 31 the remaining life of the turbocharger 11. Moreover, a service tool can be used to read the remaining life of the turbocharger 11.

The present invention is advantageous because it provides an indication of when the turbocharger 11 requires maintenance based on the actual duty cycle of that individual turbocharger 11 without having the expense of directly monitoring the operating conditions of the turbocharger 11, i.e., turbocharger rotational speed. The present invention considers the actual duty cycle, or use of the turbocharger 11, by indirectly monitoring the operating conditions of the turbocharger 11 with existing sensors. For instance, most vehicles already include an engine speed sensor, pressure sensors, and temperature sensors. Thus, by indirectly monitoring the turbocharger operating condition via the existing sensors, there is a reduction or elimination of the costs and time associated with the assembly of additional sensors, the modification of the turbocharger shaft to include a speed sensor, and the wiring of the additional sensors, including the turbocharger speed sensor, to the electronic control module. In addition, because the present invention does not predict the turbocharger life based on a representative or average duty cycle, the costs and inconveniences associated with under estimation and over estimation of the turbocharger life are reduced.

Further, the present invention is advantageous in that it monitors both the fatigue and creep of both the compressor and turbine wheels 13 and 14. Fatigue and creep are two different phenomenon that affect the life of the turbocharger components. Creep is caused by high rotational speeds, particularly at high inlet temperatures, and fatigue is caused by acceleration and de-acceleration of the turbocharger rotational speeds. Thus, whether the turbocharger will fail due to creep or fatigue will depend on the duty cycle of the turbocharger, and it is advantageous to monitor both. In addition, a sophisticated version of the present invention can consider the effect of material degradation caused by high temperatures on the progression of fatigue and creep. Moreover, data from the life determining algorithms can be downloaded and stored to a service tool or computer. The downloaded data from an apparently dead turbocharger can be analyzed and used to update predetermined fatigue and creep criteria and knowledge of turbocharger lives. Further, the pressure ratio transition cycle data received from the turbocharger life determining system can be used to help determine the life of other engine components, such as cylinder heads, head to block joints, exhaust valves, pistons, cylinder liners and fuel injectors, affected by combustion temperatures, cylinder pressure, and exhaust temperature.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A turbocharger life determining system, comprising:
    a turbocharger;
    at least one compressor inlet pressure sensor;
    at least one compressor outlet pressure sensor;
    an electronic control module in communication with the sensors and including, means for monitoring at least one of fatigue and creep of at least one component of the turbocharger, at least in part, by sensing at least one parameter correlated to an estimated turbocharger rotational speed, and the means for monitoring including at least one of: a means for storing data associated with a plurality of turbocharger speed transition cycles, and a means for storing data associated with an amount of time the turbocharger operates at a plurality of pressure ratios; and
    means for comparing at least one of the monitored fatigue and the monitored creep to a predetermined fatigue criteria and a predetermined creep criteria, respectively.

2. The turbocharger life determining system of claim 1 including at least one of an engine speed sensor, a compressor inlet temperature sensor, and a turbine inlet temperature sensor being in communication with the electronic control module.

3. The turbocharger life determining system of claim 1 means for comparing a monitored fatigue and a monitored creep with a predetermined fatigue criteria and predetermined creep criteria, respectively.

4. The turbocharger life determining system of claim 1 including the means for monitoring fatigue that includes the means for storing data associated with a plurality of turbocharger speed transition cycles; and
 means for determining a fatigue stress damage for each turbocharger speed transition cycle.

5. The turbocharger life determining system of claim 4 wherein the fatigue stress damage for each turbocharger speed transition cycle is based upon a size of a speed transition cycle and pressure ratios associated with the speed transition cycle.

6. The turbocharger life determining system of claim 5 including means for storing a summation of fatigue stress damages for a plurality of turbocharger speed transition cycles.

7. The turbocharger life determining system of claim 1 including the means for monitoring creep that includes means for storing data associated with an amount of time the turbocharger operates at a pressure ratio; and
 means for determining a creep stress damage for each amount of time.

8. The turbocharger life determining system of claim 7 wherein the creep stress damage for each amount of time is based upon compressor inlet temperature and the pressure ratio for the amount of time.

9. The turbocharger life determining system of claim 8 including means for storing a summation of creep stress damages for a plurality of amounts of time.

10. A method of determining a life of a turbocharger comprising the steps of:
 monitoring at least one of fatigue and creep of at least one component of the turbocharger, at least in part, by sensing at least one parameter correlated to an estimated turbocharger rotational speed;
 the monitoring step including at least one of: storing data associated with a plurality of turbocharger speed transition cycles, and storing data associated with an amount of time the turbocharger operates at a plurality of pressure ratios; and
 comparing at least one of the monitored fatigue and the monitored creep to a predetermined fatigue criteria and a predetermined creep criteria, respectively.

11. The method of claim 10 wherein the step of monitoring includes a step of monitoring material degradation of at least one component of the turbocharger, at least in part, by monitoring at least one; a plurality of speed transition cycle ranges, and a plurality of temperature range/pressure ratio range combinations.

12. The method of claim 10 wherein the step of monitoring includes a step of calculating a ratio relationship between compressor inlet pressure and compressor outlet pressure; and
 storing data associated with each of a plurality of pressure ratio ranges.

13. The method of claim 12 wherein the step of monitoring includes a step of sensing at least one of engine speed, compressor inlet temperature, and turbine inlet temperature; and
 storing data associated with each of a plurality of compressor inlet temperature ranges.

14. The method of claim 12 including a step of indicating when at least one of the monitored fatigue and creep, which is a summation of data, exceeds a predetermined fatigue data and creep data, respectively.

15. The method of claim 12 including a step of recording at least one of the monitored fatigue, the monitored creep and a calculated cumulative stress value for the turbocharger in a database including identifying turbocharger information.

16. The method of claim 10 including the step of storing data associated with the plurality of turbocharger speed transition cycles; and
 determining a fatigue stress damage for each turbocharger speed transition cycle.

17. The method of claim 16 wherein the determining step is based on a size of a speed transition cycle and pressure ratios associated with the speed transition cycle; and
 summing fatigue stress damages for a plurality of turbocharger speed transition cycles.

18. The method of claim 10 including the step of storing data associated with the amount of time the turbocharger operates in a plurality of pressure ratios; and
 determining a creep stress damage for each amount of time.

19. The method of claim 18 wherein the determining step is based on a compressor inlet temperature and the pressure ratio for the amount of time; and
 storing a summation of creep stress damages for a plurality of amounts of time.

20. The method of claim 10 wherein the monitoring step includes monitoring fatigue and creep.

\* \* \* \* \*